Sept. 2, 1958  H. E. ENGLESON ET AL  2,850,142
ARTICLE TRANSPORTING AND CONVEYING MECHANISM
Filed April 5, 1954  3 Sheets-Sheet 1
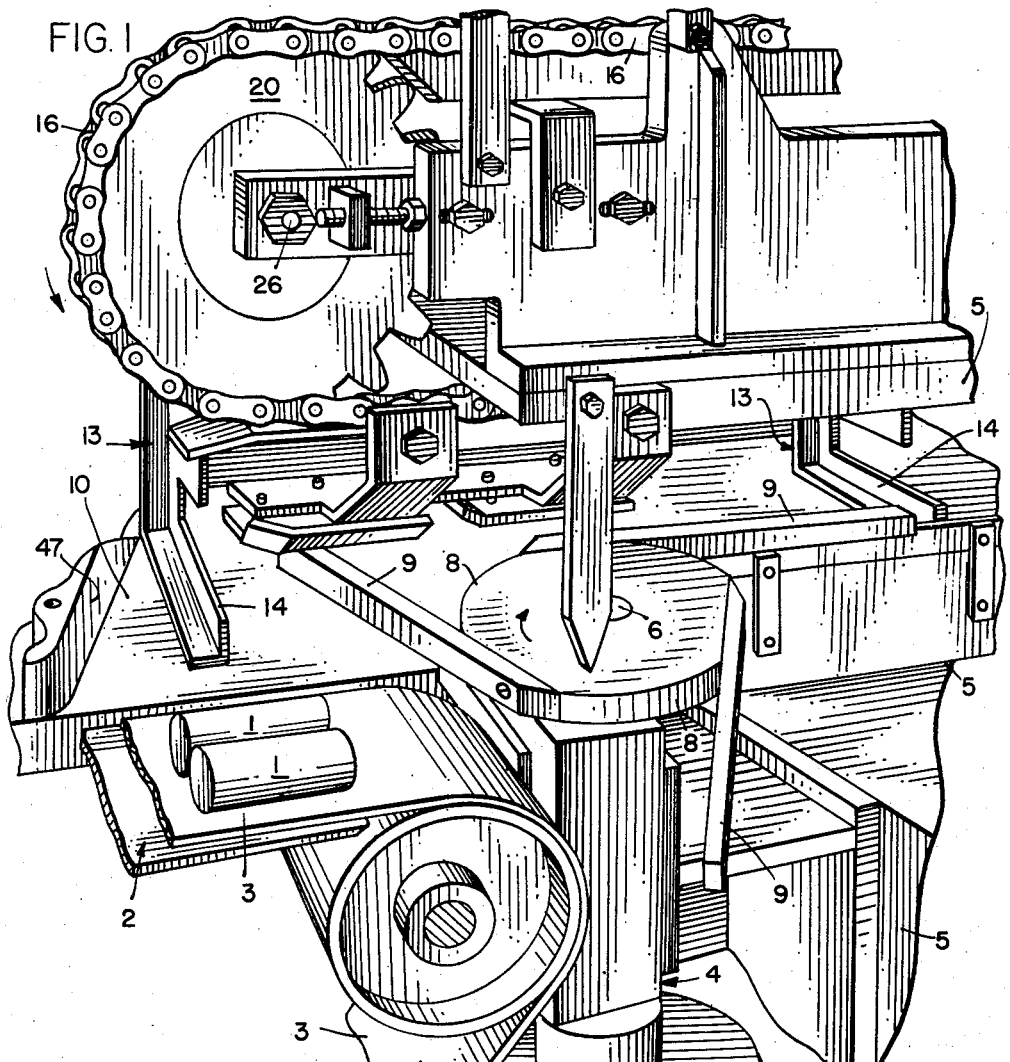
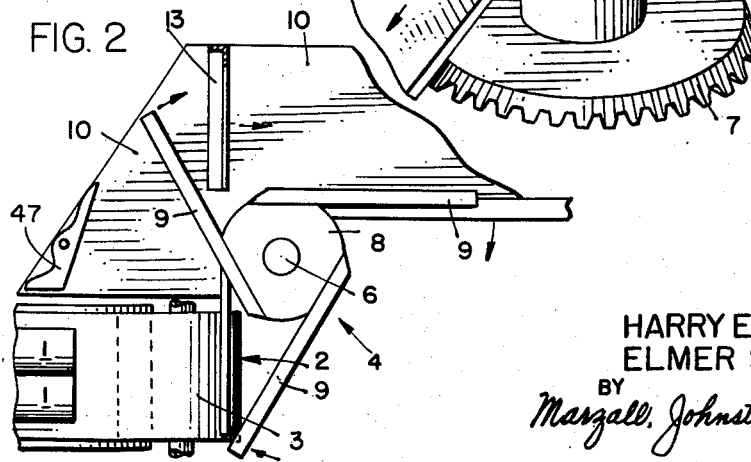
INVENTORS:
HARRY E. ENGLESON
ELMER SRAMEK
BY
Marzall, Johnston, Cook & Root.
ATT'YS Sept. 2, 1958     H. E. ENGLESON ET AL     2,850,142
ARTICLE TRANSPORTING AND CONVEYING MECHANISM
Filed April 5, 1954     3 Sheets-Sheet 2
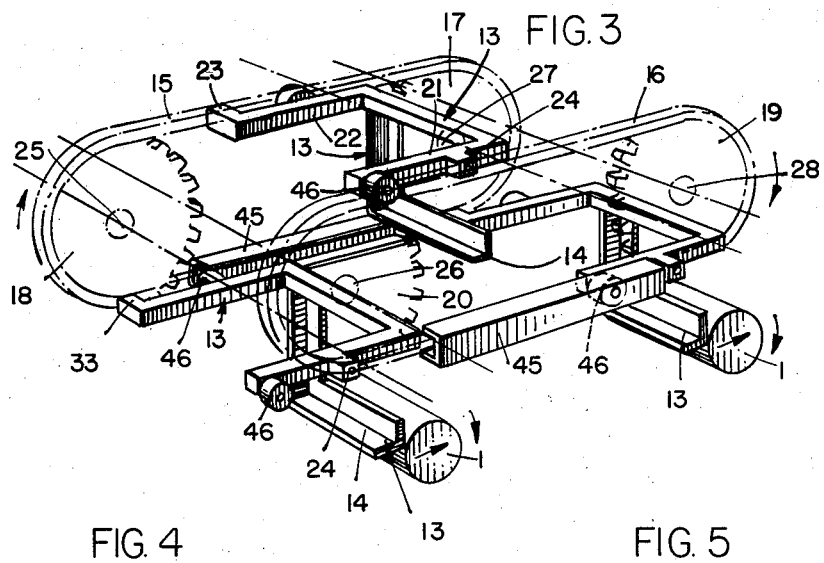
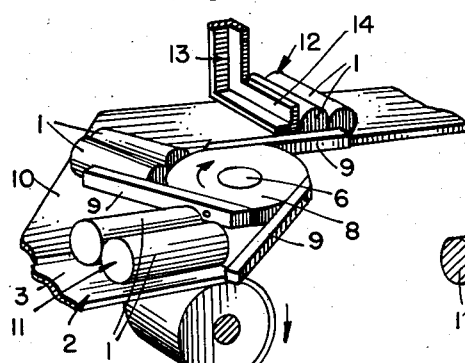
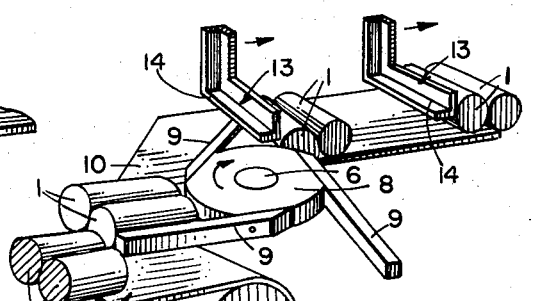
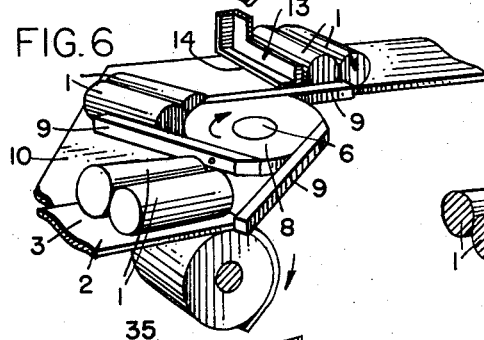
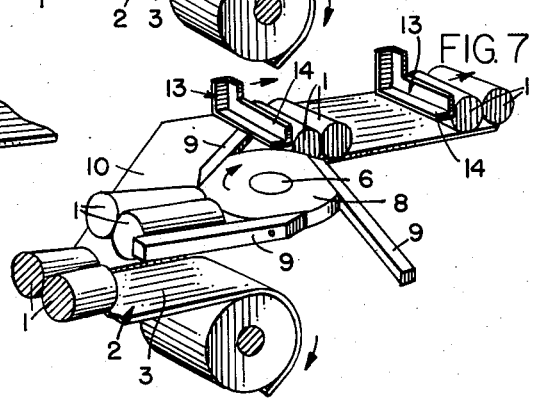
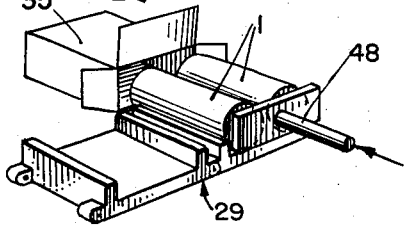
INVENTORS:
HARRY E. ENGLESON
ELMER SRAMEK
BY Marshall, Johnston, Cook & Root
ATT'YS

INVENTORS:
HARRY E. ENGLESON
ELMER SRAMEK

United States Patent Office 2,850,142
Patented Sept. 2, 1958

2,850,142
ARTICLE TRANSPORTING AND CONVEYING MECHANISM

Harry E. Engleson, Chicago, and Elmer Sramek, Cicero, Ill., assignors to F. B. Redington Co., Chicago, Ill., a corporation of Delaware Application April 5, 1954, Serial No. 420,883

4 Claims. (Cl. 198—33)

This invention relates to transporting and conveying mechanism for shifting articles from one position to another and then conveying them to a predetermined position for inserting the same into cartons.

The present invention consists in redistributing and transferring articles which are received from the discharge end of a conveyer, the articles or packages being shown as arranged in two lines and in end-to-end relationship. As the articles reach the discharge point of the conveyer, they are transported by spaced horizontal arms arranged in the path of the oncoming articles for shifting to a predetermined position at right angles to their position on the conveyer. The transfer arms are so constructed and arranged that the articles will be shifted from a straight line position to a position ninety degrees therefrom for later transportation by conveying mechanism which includes a plurality of spaced pushers attached to spaced-apart continuously operating parallel chains. The articles are caused to be first moved along a conveyer in two lines to a predetermined position where delaying, stop or clamping mechanism is provided to cause two articles (one from each line) to be arranged in side-by-side relationship for later insertion endwise into a carton. The articles in the present instance specifically comprise stacks of flat cookies which are sacked or wrapped in tubular form. However, the articles need not be in the shape specifically disclosed, as the mechanism of the invention may handle articles or packages with facility regardless of their shape, size or configuration.

Originally, the articles are placed upon separate conveyers, then shifted to an elevating device for deposit upon a transport mechanism for transporting them, two at a time, continuously along a predetermined path where they are deposited onto a conveyer arranged at right angles for shifting the articles in end-to-end relationship in two lines. This latter arrangement is disclosed in applicant's copending application, Serial No. 420,882, filed April 5, 1954, and entitled Article Conveying and Transporting Mechanism.

The primary object of the present invention consists in providing novel means for conveying articles along a conveyer in a plurality of lines and in end-to-end relationship, where the articles will be shifted to a position off the conveyer for location at an angle of ninety degrees to be later engaged by pusher elements connected to spaced parallel chains, the pusher elements being in offset relationship to provide space beneath certain conveying or pushing mechanism for transfer, and then moved to cartoning position.

Another object of the invention consists in the provision of new and novel mechanism, including a rotating element or transfer wheel, having a plurality of arms for receiving articles from a continuously moving belt to shift the articles from the belt and place them onto a supporting table at an angle of ninety degrees for later conveying to cartoning position in groups of two arranged in side-by-side relation for deposit into a carton.

Still another object of the invention consists in the provision of a transfer mechanism which is provided with new and novel means for transferring articles in a predetermined position on a moving conveyer to another position for engagement with pusher elements which pick the articles off a conveyer and transfer them in a different arrangement to cartoning position.

A further object of the invention resides in the provision of a novel conveying device to push articles along a bed by means of a plurality of spaced pushers connected to the reaches of opposed spaced parallel chains to shift the articles to a predetermined position for cartoning purposes.

A still further object resides in the provision of a vertically disposed element having horizontal rotating arms cooperating with conveying mechanism which includes pushers pivotally connected in offset relation to opposed reaches of spaced parallel chains.

Still another object of the invention resides in the provision of a conveyer for regrouping articles in an angular position to be engaged by pushers operated by sprockets which have their shafts arranged in offset relationship.

Another object consists in the new and novel arrangement of the parts, the location and construction of the parts, and the provision of mechanism for feeding articles in proper timed relationship with the operation of certain parts or units whereby the articles will be properly fed to the units regardless of the operation of other units.

Another object of the invention resides in the provision of stop means operated in conjunction with holding or clamping means to hold articles from a line or track of articles to effect proper delivery of a predetermined number of articles when there are packages or articles in line, and to prevent feeding of articles when articles are not in line.

Numerous other objects and advantages will be apparent throughout the progress of the specification which is to follow.

The accompanying drawings illustrate a selected embodiment of the invention and the views therein are as follows:

Fig. 1 is a detail side elevational view, partly in section, and showing certain transferring and conveying mechanism for shifting articles from a predetermined position on a continuously moving conveyor to a different position remote from the conveyer, and then conveying the articles at an angular position for cartoning purposes;

Fig. 2 is a detail top elevational view of a part of the structure disclosed in Fig. 1;

Fig. 3 is a detail diagrammatic or schematic perspective view disclosing certain pusher elements which have their pivotal connections to spaced parallel chains spaced in offset relation to the opposed reaches of the chains;

Figure 9:
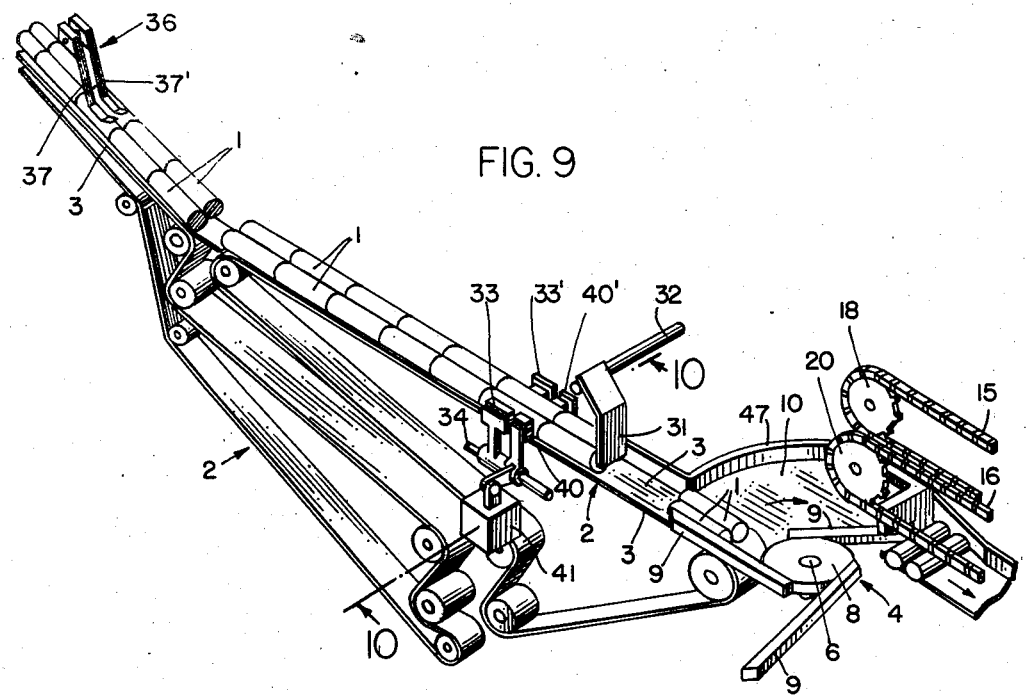
Figure 10:
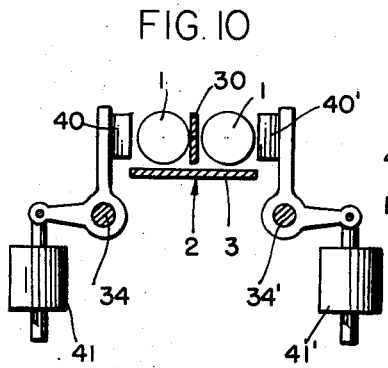

Figs. 4 to 8 inclusive are detail top plan views showing diagrammatically the progressive movement of the articles as they leave the conveyer in endwise position for transportation at right angles for sidewise movement and to cause articles from separate lines to be shifted at an angle and in side-by-side relationship for insertion endwise into a carton;

Fig. 9 is a detail perspective view showing diagrammatically the conveyor delivering two lines of articles in end-to-end relationship, and the manner in which the clamping members and stop means effect proper feeding of articles to the transfer wheel for transportation toward cartoning position;

Fig. 10 is a detail transverse sectional view on the line 10—10 of Fig. 9; and

Figure 11:
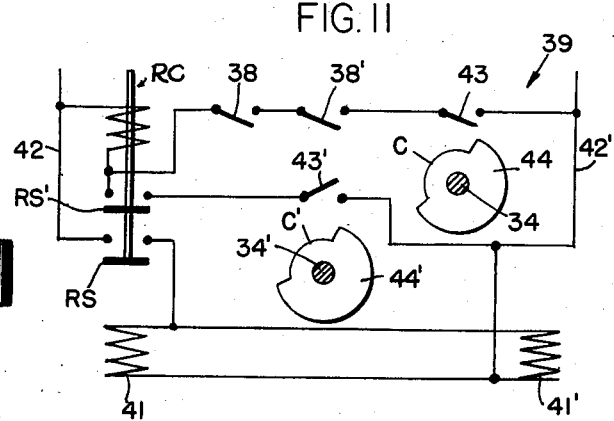

Fig. 11 is an electrical diagram showing the manner in which the clamping means and stop means are adapted to be operated and controlled.

The particular construction herein shown for the purpose of illustrating the invention comprises transport mechanism for transporting articles, arranged in end-to-end relationship in a pair of lines or tracks, to a position where they will be arranged remotely and at an angular position. The articles are adapted to be conveyed along a table by the engagement of spaced pushers which move the articles two at a time, in side-by-side contact for insertion into a carton. The particular article transporting and conveying mechanism is an actual machine in which articles, such as stacks of flat, circular cookies, are arranged within a sack or wrapper in relatively tubular form.

Articles are conveyed to discharge position in end-to-end relation in a plurality of lines by a continuously operating belt-type conveyer. The articles are adapted to be moved by transporting mechanism to be shifted to a remote position and at an angle of ninety degrees for later transportation and cartoning.

Two articles 1, Fig. 1, as they arrive toward the discharge end of a conveyer 2 from two lines, are picked off the conveyer belt 3 by a rigid transport device 4 which is supported by suitable framework 5. The transport device 4, Figs. 1 and 2, comprises a vertical shaft 6 which is driven by a gear 7, Fig. 1, from mechanism (not shown) but which is operated from an operating part of certain cartoning mechanism. The transport mechanism 4 picks up two articles 1, which are arranged in two single lines, each in end-to-end relation on the conveyer 3, and deposit two articles (one from each line) successively at a point remote from the conveyer and at right angles thereto.

The transfer device 4 includes a circular plate or disc 8 to which a plurality of sweep arms 9 are connected (three arms being shown). The arms 9 are arranged tangentially of the disc 8 and are connected to the periphery thereof, Figs. 1 and 2. The construction is such that a sweep arm 9 will overlie the top of the conveyer 2 and over the top of a stationary supporting plate or table 10. As the articles are moving along the conveyer 2, at the discharge end thereof, a sweep arm 9 will pick up two articles 1 (one from each line, Figs. 1 and 5) successively and sweep them along the plate or table 10 in a position at right angles to the position the line of articles attains on the conveyer 2. The sweep arms 9 move the articles successively from the position shown at 11 to the position shown at 12, Fig. 4. As soon as the articles arrive to position 12, Fig. 4, they are successively engaged by successive pushers 13, Figs. 1 to 3.

The pushers 13, Fig. 3, each include a transverse pusher arm 14 which is arranged between opposed parallel sprocket chains 15 and 16. The sprocket chain 15 is trained over sprockets 17 and 18, while the chain 16 is trained over sprockets 19 and 20 respectively. The pusher arms 14 have side arms 21 and 22 connected thereto, which side arms are pivoted at 23 and 24 respectively to the chains 15 and 16.

The pivotal connections 23 and 24 are not directly opposite to each other. One pivotal connection, the connection 23, is arranged forwardly of the opposite pivotal connection 24. The connection 23 is spaced longitudinally a predetermined distance from the other rearward pivotal connection 24, Fig. 3.

A stub shaft 25, upon which the sprocket 18 is mounted, is spaced forwardly of a stub shaft 26 upon which the sprocket 20 is mounted. Also, a stub shaft 27, upon which the sprocket 17 is mounted, is spaced forwardly of a stub shaft 28 upon which the sprocket 19 is mounted. The distance between the axial center lines of the shafts 25 and 26 is equal to the spacing between the center of the shafts 27 and 28, the said shafts not being in axial alignment. The pivotal connection 23 of the arms 21 to the chain 15, and the pivotal connection 24 to the chain 16, is equal to the difference in longitudinal spacement of the shaft 25 with respect to the shaft 26, and of the shaft 27 with respect to the shaft 28. The spacing of the shafts 25 and 26, and 27 and 28, in offset relation are shown by dot-and-dash lines in Fig. 3. It is because of the offset spacing of the pivots 23 and 24 being equal to the offset spacing of the shafts 25 and 26 and the shafts 27 and 28 that the pusher arms 14 will operate properly. The arrangement, therefore, provides for the pivotal connection of the arms 14 at offset points with respect to the chains, and for offsetting the shafts of the sprockets.

Either the sprocket 17 or 18 may be the driving sprocket, while the other sprocket for the chain 15 may be the idler sprocket. Likewise, either the sprockets 19 or 20 may be the driving sprocket while the other sprocket for the chain 16 may be the idler sprocket. The two driving sprockets are so driven, preferably by an operating part of certain cartoning mechanism, that they will rotate in proper synchronism with respect to the movement of the sweep arms 9 so that one arm 14 will sweep a pair of articles 1 from the conveyer 2 and deposit them onto the plate 10 just prior to the time a pusher arm 14 arrives in proper position to pick up a pair of articles 1, as clearly shown in Fig. 4. The translation of the successive arms 14 push the articles in side-by-side relation, immediately in front of a pusher arm 14, and move the two articles along the plate table 10 for deposit into buckets of a cartoning conveyer 29, Fig. 8. The separate lines of articles 1 on the conveyer belt 3 are divided by longitudinal guide 30, Fig. 10.

A stop or holder member 31, Fig. 9, is positioned in the path of movement of the two lines of articles on the conveyer and engage the ends of the last article of each line as they are brought to position for discharge to the transfer wheel 4. The stop member 31, when released, moves in the direction of travel of the belt 3 of the conveyer 2, to release two articles (one from each line) in proper timed relation with the operation of the transfer wheel 4.

After the release of a pair of articles from the stop member 31, a pair of articles arranged side-by-side will be shifted along the bed or table 10 by the arms 9, then conveyed by the pusher arms 14 and finally moved into the buckets of the carton conveyer 29 for insertion through the open end of a carton, Fig. 8.

In order to provide for delivering articles or packages 1 to the transfer wheel mechanism 4, the lines of articles may be stopped intermittently to permit a pair of articles to be released, one from the leading end of each line for delivery on the conveyer belt 3 to the transfer wheel mechanism, in side-by-side relationship as shown in Figs. 1 and 2. The article lines or trains carried on the belt 3 may be separated by the guide partition 30 which extends above and longitudinally of the belt 3, terminating at an article releasing station spaced from the article discharging or delivering end of the conveyer 2. The article trains or lines in transit toward the transfer wheel mechanism 4, as shown in Fig. 9, may be halted on the continuously moving conveyer belt 3 by a stop or holder member 31. This stop member 31 comprises a member in the form of a blade which is secured on a rock shaft 32. The stop 31 is disposed at the forward end of the guide partition 30 in position normally in the path of movement of the two lines or trains of articles 1 and hence adapted to abut the forward ends of the leading article in each train. As a consequence, both article trains may be stopped by action of the stop member 31 when the leading articles thereof reach and abut the stop member 31 adjacent the discharge end of the conveyer 2 in position for delivery to the transfer wheel mechanism.

The stop member 31 may be swingably moved in the direction of travel of the conveyer belt 3 in order to release the leading articles of each train for delivery, by the continuously moving belt 3, to the transfer wheel mechanism, such article releasing movement of the stop member 31 being accomplished intermittently and in timed relationship with respect to the operation of the transfer wheel mechanism 4.

Suitable clamp means may be provided for halting movement of the article trains on the belt 3 during the interval when the stop member 31 is operated to release the leading articles for delivery to the transfer wheel mechanism 4. As shown, the clamp means may comprise a front mechanical clamp 33, and a rear mechanical clamp 33', one for each article train. The clamps 33 and 33' are disposed respectively on opposite sides of the conveyer belt 3 in position to be pressed clampingly inwardly toward the partition 30 to thereby clampingly secure an article of each train or line between the partition 30 and the corresponding clamp 33 or 33'. The clamps 33, 33' may each comprise an arm member on and rockably movable with a corresponding rock shaft 34 and 34', Fig. 10, driven intermittently, in timed relationship with the transfer wheel device 4, to thereby move the clamps 33 and 33' to and from clamping position with respect to the second article in each train.

After the clamps 33, 33' have been moved to article clamping position by operation of the shafts 34, 34', the rock shaft 32 for the stop 31 may be actuated to raise the stop member 31, thereby allowing the leading articles or packages at the forward ends of the stopped lines or trains to be delivered by the conveyer belt 3 in side-by-side relationship to the transfer wheel mechanism 4. The transfer wheel mechanism serves to shift delivered articles along the table 10, by action of the arms 9, for delivery thence by the pusher arms 14 into the buckets of the conveyer 29 for insertion into a carton 35 through the open end thereof as shown more particularly in Fig. 8. After closure of the carton it may be wrapped if desired.

Suitable means may be provided for operating the rock shafts 32, 34 and 34' in timed relation with respect to the operation of the transfer wheel mechanism 4. For this purpose cam mechanism drivingly connected with the rock shaft and driven with the mechanism 4 may be employed. The stop member 31 and the clamps 33 and 33' accordingly may operate in synchronism to rerelease a pair of articles successively from the forward end of the lines or trains of articles for delivery to the transfer wheel mechanism, while restraining forward movement of the articles in the trains behind the leading articles then being released for delivery to the transfer wheel mechanism. During the interval, while the stop member 31 is performing its article releasing function, the mechanical clamps 33 and 33' will remain in closed or clamped position until after the stop member 31 shall have been returned to its train stopping position. The mechanical clamps 33, 33' may then open to allow the package trains to again advance until stopped by engagement of the leading packages of the trains with the stop member. The foregoing intermittent package releasing operation of the stop member 31 and the mechanical clamps 33 and 33' may continue without interruption so long as the supply of packages or articles in the package trains is maintained.

The present invention, however, contemplates the provision of means for stopping the package releasing operation of the mechanism in the event that the supply of articles in either of the article trains should fail to be maintained. To this end detector means 36, Fig. 9, may be provided at a suitable locus or station in the path of the article trains to determine whether or not the supply of articles is being maintained in both of the trains of the conveyer 2. The detector means may comprise lever arms 37 and 37', one for each train or line of articles, said arms being pivotally mounted in position such that each may engage and be supported by the articles in its corresponding train. Associated with each lever is a microswitch 38, 38', Figs. 9 to 11, adapted to be maintained in normal position so long as its associated lever is supported by an article in the corresponding article train, each switch being in another of its positions when the supply of articles in the corresponding train is reduced to an extent such that the lever is unsupported.

The switches 38, 38', Figs. 9 to 11, may be interconnected in a suitable electrical circuit 39, Fig. 11, for the operation of a front electrically operated clamp 40 and a rear electrically operated clamp 40' respectively. The clamps 40 and 40' are disposed adjacent the mechanical clamps 33 and 33' and operable to prevent forward movement of both package trains or lines whenever one or both of the detectors 37 or 37' show a failure of the supply of articles in the corresponding package train, Figs. 9 to 11.

In order to operate the electrically operated hold-up clamps 40 and 40' under the control of the microswitches 38 and 38', suitable spring means may be provided for normally urging the clamps 40 and 40' on the shafts 34 and 34' toward package clamping position. Solenoid means 41, 41', Figs. 9 to 11, may be provided respectively for holding the clamps 40 and 40' in retracted non-clamping position, against the action of said spring means when and so long as the solenoid means shall be energized. The solenoid means 41 and 41', Fig. 11, may be interconnected in parallel between power conductors 42 and 42', a normally open relay switch RS being connected between the solenoid means and one of the power conductors. The relay switch RS is adapted to be closed when and so long as an associated relay coil RC is energized. The coil RC may be interconnected between the power conductors 42 and 42', in series with the microswitches 38 and 38' and a normally open control switch 43. The relay coil may also be interconnected between the conductors 42 and 42' in series with a relay holding switch RS' and a normally closed control switch 43', said switches being in parallel relationship with respect to the control switch 43 and the microswitches 38 and 38'.

The control switches 43 and 43', Fig. 11, may be operated in unison with the mechanical clamps 33 and 33', Fig. 9, so that the normally open switch 43 will be closed and will remain closed, and the normally closed switch 43' will open and will remain open, only when and so long as the mechanical clamps 33 and 33' are in closed clamping position with respect to articles in the article trains. Such operation of the control switches 43 and 43' may be accomplished by means of switch operating cams 44 and 44' mounted respectively on the shafts 34 and 34' to move in unison with the clamp means 33 and 33'. The cams 44 and 44' may have switch operating cam portions C and C' respectively. So long as an adequate supply of packages is maintained in both of the article trains, the microswitches 38 and 38' will remain closed. Since the normally open switch 43 closes and remains closed each time and so long as the clamps 33 and 33' are moved to and remain in closed position, the relay coil RC will be energized in response to closure of the switch 43, immediately after closure of the microswitches 38 and 38' as the result of the establishment of article trains each containing at least a predetermined number of packages sufficient to actuate the detector levers 37 and 37'.

When the coil RC is thus energized, the switches RS and RS' will both close. Closure of the switch RS will energize the solenoid means 41 and 41', thereby retracting the clamps 40 and 40' from package clamping position. Closure of the switch RS' will serve to maintain the supply of energizing power to the relay coil RC, when the switch 43 opens with the periodic release of the clamps 33 and 33', providing, of course, that the switch 43' is closed when switch 43 is open. In that connection, the switch actuating cams 44 and 44' may be so formed as to assure that the switches 43 and 43' are never both open simultaneously. This may be accomplished by forming the cam portions C and C' so that each switch must close before the other may open.

As a consequence of the foregoing cam arrangement, so long as an adequate package supply is maintained in both of the article trains, both of the microswitches 38 and 38' will remain closed and the solenoid RC will remain energized, either through the circuit containing the switch 43 or through the circuit containing the switch 43', even though said switches respectively close and open with the intermittently operating clamp means 33 and 33'.

When one or both of the microswitches 38 or 38' becomes opened, as the result of reduction of packages below a predetermined minimum number in either or both of the package trains, the relay coil will remain energized until the switch 43' opens upon the closure of the clamp means 33, 33'. As soon as the switch 43' opens, with one or both of the switches 38, 38' open, or if one or both of the switches 38, 38' should open while the switch 43' is open, the coil RC will immediatelfy become de-energized, thereby allowing the switches RS and RS' to open. The opening of the switch RS will, of course, deenergize the solenoid means 41, 41' and allow the hold-up clamps 40 and 40' immediately to move to package clamping position, thereby halting further movement of the package trains. The clamps 40, 40', after thus being released for clamping action, will remain in package clamping position until the supply of packages in the article trains thereafter shall cause both of the switches 38 and 38' to become closed.

It will be seen from the foregoing that the switches 43 and 43' function to prevent actuation of the clamp means 40 and 40', in clamping direction as well as in releasing direction, except when the mechanical clamps 33 and 33' are in clamping position. This is a highly desirable aspect of the invention, since packages may be delivered to the package trains and thus may operate the switches 38, 38' at any instant during the operating cycle of the stop member 31 and the mechanical clamps 33 and 33', thereby affording the possibility of a package jam at the transfer wheel mechanism 4 in the event that the clamp means 40, 40' should be operated either to clamping or releasing position except during the interval when the mechanical clamps 33, 33' are in package clamping position and the article trains consequently stationary.

If desired, a single switch may be employed in place of the two switches 38 and 38'. In that instance, suitable switch actuating means, interconnected with the levers 37 and 37', is provided for holding such single switch in position, so long as the supply of articles is adequately maintained in both trains. The actuating means for a single switch is operated to allow said single switch to be operated in the event either of the levers 37 or 37' should drop as the result of failure of an adequate supply of articles in the corresponding article train.

Guides 45, Fig. 3, may be provided to insure proper horizontal positioning of the pushers 13. These guides receive rollers 46 which are pivotally mounted on the arms of the pusher members 13. The rollers 46 are received in the raceways of the guides, Fig. 3, and thus maintain the pusher members 13 in proper horizontal position.

An abutment guide 47, Figs. 1 and 9, arranged at one end of the table 10, maintains the articles 1 in position to keep them in position and prevent them from being displaced.

The articles 1 are moved by the conveyor 2 toward discharge position in end-to-end relationship as shown in Fig. 9. At a point near the discharge end of the conveyer 2, the sweep arms 9 of transfer wheel 4 transfer the articles 1 from the position shown at 11, Fig. 4, to position 12 at right angles for engagement by the arms 14 of the pusher members 13. The pusher members 13 move a pair of articles 1 successively onward until they arrive in the buckets of the cartoning conveyer 29. Two articles 1 arranged in side-by-side contacting relation, Fig. 8, are engaged by a pusher element 48 to push a pair of articles off the conveyer 29 and into the carton 35.

The construction of the machine of the present invention is such that the articles 1 on the conveyer 2 will be discharged in proper timed relationship with respect to the structure which commences the next succeeding operation, continuously from the time the articles move to discharge position on the conveyer 2 until they are packaged into a carton 35. The operation of the device is such that articles are properly synchronized with respect to mechanisms which convey, transfer and transport the articles.

Changes may be made in the form, construction and arrangement of the parts without departing from the spirit of the invention or sacrificing any of its advantages and the right is hereby reserved to make all such changes as fall fairly within the scope of the following claims.

The invention is claimed as follows:

1. Conveying and transferring mechanism comprising conveyer means to convey articles continuously along a predetermined path to discharge position in predetermined lines and in end-to-end relation, a supporting table adjacent the discharge end of the conveyer, a plurality of connected spaced arms overlying the conveyer and supporting table and adapted to lie in the path of articles being conveyed along the conveyer, means to operate said arms to bring the arms to shifting position to remove articles from the conveyer and deposit them on the table to a predetermined position remote from the conveyer and at an angle to the position the articles had on the conveyer, continuously operating means to engage articles moved to said predetermined position by said arms to move said articles along a predetermined path in side-by-side spaced relation, said operating means comprising a pair of laterally spaced apart chains, opposed sprockets for said chains, said sprockets having their axes offset, and pushers connected to said chains at offset points.

2. Conveying and transferring mechanism comprising conveyer means to convey articles in end-to-end relation continuously along a predetermined path to discharge position, a receiving member adjacent the discharge end of the conveyer to receive articles from the conveyer, a transfer wheel having parts overlying the conveyer and the receiving means and adapted to lie in the path of articles being conveyed along the conveyer to shift articles from the conveyer to the receiving means, means to operate said transfer wheel and a transport device to move articles from the receiving member to a predetermined position, said transport device including a first sprocket shaft, a second sprocket shaft spaced laterally from the first sprocket shaft, the axes of said shafts being offset, a third sprocket shaft, sprockets on said first and third shafts, a sprocket chain trained over the first and third sprockets, a fourth sprocket shaft spaced laterally from the second sprocket shaft, the axes of the second and fourth shafts being offset, sprockets on said second and fourth shafts, a sprocket chain trained over said latter two sprockets, and pushers between said two chains and connected thereto in offset relation.

3. Conveying and transferring mechanism comprising conveyer means to convey articles in end-to-end relation continuously along a predetermined path to discharge position, a receiving member adjacent the discharge end of the conveyer to receive articles from the conveyer, a transfer wheel having parts overlying the conveyer and the receiving means and adapted to lie in the path of articles being conveyed along the conveyer to shift articles from the conveyer to the receiving means, means to operate said transfer wheel and a transport device to move articles from the receiving member to a predetermined position, said transport device including a first sprocket shaft, a second sprocket shaft spaced laterally from the first sprocket shaft, the axes of said shafts being offset, a third sprocket shaft, sprockets on said first and third shafts, a sprocket chain trained over the first and third sprockets, a fourth sprocket shaft spaced laterally from the second sprocket shaft, the axes of the second and fourth shafts being offset, sprockets on said second and fourth shafts, a sprocket chain trained over said latter two sprockets, and pushers between said two chains and connected thereto in offset relation, the offset connection of the pushers to the chains being equal to the axial offset of the first and third or the second and fourth shafts.

4. Conveying and transferring mechanism comprising an endless conveyer belt for conveying articles continuously along a horizontal path, a supporting table adjacent one end of the conveyer belt having a portion extending angularly from one side thereof and having an upper surface substantially coplanar with the upper surface of said conveyer belt, said supporting table having an extension portion contiguous with the angular portion in spaced parallel relation to the longitudinal axis of the conveyer belt and means for transferring the articles from the conveyer belt across the angular portion of the table to the extension thereof, whereby the articles are arranged on the extension portion at an angle to the position the articles had on the conveyer belt, said means including a vertical drive shaft, a disc mounted on said shaft for corotation therewith, and a plurality of spaced arms arranged tangentially of said disc and connected to the periphery thereof, said arms movable through a horizontal path overlying the conveyer belt and supporting table.

References Cited in the file of this patent

UNITED STATES PATENTS

| | | |
|---|---|---|
| 790,811 | Alvey | May 22, 1905 |
| 925,928 | Lueke | June 22, 1909 |
| 1,096,310 | Martin | May 12, 1914 |
| 1,588,903 | Parker | June 15, 1926 |
| 2,341,705 | Fedorchak | Feb. 15, 1944 |
| 2,509,725 | Dalton | May 30, 1950 |
| 2,525,132 | Herts | Oct. 10, 1950 |
| 2,538,408 | Baker et al. | Jan. 16, 1951 |
| 2,632,553 | Stirn | Mar. 24, 1953 |
| 2,643,619 | Bonebrake | June 30, 1953 |
| 2,652,139 | Baehr | Sept. 15, 1953 |
| 2,717,548 | Blair | Sept. 13, 1955 |
| 2,760,621 | Crescenzo | Aug. 28, 1956 |